A. A. Knowlton
Artificial Teeth

No. 75431      Patented March 10 1868

Attest:
Theo Tusche
W. Trewin

Inventor,
A. A. Knowlton
Per Munn
Attorneys

UNITED STATES PATENT OFFICE.

ALMAS A. KNOWLTON, OF ST. ALBANS, VERMONT.

IMPROVEMENT IN ARTIFICIAL TEETH.

Specification forming part of Letters Patent No. 75,431, dated March 10, 1868.

*To all whom it may concern:*

Be it known that I, ALMAS A. KNOWLTON, of St. Albans, in the county of Franklin and State of Vermont, have invented a new and useful Improvement in Artificial Teeth; and I do hereby declare that the following is a full, clear, and exact description thereof, which will enable others skilled in the art to make and use the same, reference being had to the accompanying drawings, forming part of this specification, in which—

Figure 3:
Figure 2:
Figure 1:

Figure 1 is a view of a finished set of teeth. Fig. 2 is a section taken in the line $x\ x$, Fig. 1. Fig. 3 is an inside view of several teeth before attaching to the base.

Similar letters of reference indicate like parts.

This invention consists in a new method of fastening artificial teeth to dental plates for the purpose of increasing the strength of the attachment without the use of platina pins. Instead of pins for fastening the teeth to the base, a small helical hole is made in the back or lingual side of the tooth, into which the rubber is pressed when it is applied in a plastic state for forming the base. The rubber hardens in the hole so made, and forms a solid tight-fitting screw, which holds the tooth firmly in its place on the base. The hole in the tooth is made about one-twelfth of an inch in diameter, for receiving the body of the screw, varying in size a little, according to the size of the tooth. The screw-hole is formed in the tooth by inserting a metal screw through the back of the mold of the teeth to the required depth in the inside of the mold. After the mold is filled and pressed together, the screw is turned forward until it penetrates the tooth to the depth required. One-tenth of an inch is sufficient for teeth of ordinary size. When the material is dry, the screw is turned back carefully until it is out of the tooth, leaving its figure impressed within the tooth. The screw is introduced into the mold so that the hole left in the tooth slants downward in upper teeth and upward in lower teeth about twenty degrees to the plane of their position in the mouth. The screw has a V-thread, which is made in twentieths to thirtieths of an inch, or thereabout. The screw is tapered a little, and for teeth in blocks or sections a slight projection is made on the inside of the teeth, in imitation of the natural gum, which is an improvement, adding both strength and beauty in any mode of attachment.

In Figs. 1 and 2, $a\ a$ are the teeth attached to the vulcanite base $b$.

In Fig. 2 are shown the rubber screws $d\ d$, making a strong and neat attachment of the teeth to the vulcanite base.

In Fig. 3 are seen the holes $c\ c$, left by the screw in the teeth before being attached to the base, as described above. At the side of the holes next to the base or root of the teeth the material is cut away in an angular or V shape after the metal screw is withdrawn from the tooth, to form a brace or strong support for the rubber screw at its base.

Having described my invention, what I claim as new, and desire to secure by Letters Patent, is—

Artificial teeth provided with holes $c$, formed with a screw-thread, when secured to a vulcanite or rubber base, $b$, by means of screws $d$, of the same material, all constructed and arranged substantially as and for the purpose set forth.

ALMAS A. KNOWLTON.

Witnesses:
R. BRAINERD,
C. JOCELYN.